United States Patent
Dagdeviren

(10) Patent No.: US 7,099,403 B1
(45) Date of Patent: Aug. 29, 2006

(54) PRECODING FOR A NON-LINEAR CODEC

(75) Inventor: Nuri R Dagdeviren, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 966 days.

(21) Appl. No.: 09/621,116

(22) Filed: Jul. 21, 2000

Related U.S. Application Data

(63) Continuation-in-part of application No. 09/540,475, filed on Mar. 31, 2000.

(60) Provisional application No. 60/169,896, filed on Dec. 9, 1999.

(51) Int. Cl.
- *H04K 1/02* (2006.01)
- *H04L 25/03* (2006.01)
- *H04L 25/49* (2006.01)

(52) U.S. Cl. ...................... 375/296; 375/285

(58) Field of Classification Search .............. 375/222, 375/220, 296, 223, 242, 245, 261, 265, 298, 375/279, 277, 286, 264, 285, 254
See application file for complete search history.

(56) References Cited

U.S. PATENT DOCUMENTS

| | | | |
|---|---|---|---|
| 5,311,547 A | 5/1994 | Wei | |
| 5,394,437 A | 2/1995 | Ayanoglu et al. | |
| 5,406,583 A | 4/1995 | Dagdeviren | |
| 5,528,625 A | 6/1996 | Ayanoglu et al. | |
| 5,602,583 A * | 2/1997 | Citta | 348/21 |
| 5,809,033 A | 9/1998 | Turner et al. | |
| 5,831,561 A | 11/1998 | Cai et al. | |
| 5,970,100 A | 10/1999 | Olafsson et al. | |
| 6,061,407 A | 5/2000 | Cherubini et al. | |
| 6,084,535 A * | 7/2000 | Karabed et al. | 341/58 |
| 6,418,170 B1 * | 7/2002 | Maurer et al. | 375/244 |
| 6,532,267 B1 * | 3/2003 | Heegard | 375/253 |
| 2002/0118702 A1 * | 8/2002 | Turner et al. | 370/466 |

FOREIGN PATENT DOCUMENTS

WO   WO 99/50739   10/1999

OTHER PUBLICATIONS

Betts et al ("Performance of Nonuniform Constellations on the Gaussian Channel", IEEE Trans. Inform. Theory, vol. 40, No. 5, Sep. 1994, pp.1633-1638).*

"An Equalizer Design Technique for the PCM Modem: A New Modem for the Digital Public Switched Telephone Network" by E. Ayanoglu, N. Dagdeviren, G. Golden and J.E. Mazo; 9 pages; IEEE Transaction in Communications; Kluwer Academic Publishers.

"The Capacity of PCM Voiceband Channels" by I. Kalet, J.E. Mazo and B.R. Saltzberg; pp. 507-511; Jul. 1993; IEEE.

"Decision Feedback Equalization" by C.A. Belfiore and J.H. Park; pp. 1143-1156; Aug. 1979; IEEE.

"Matched Transmission Technique for Channels with Intersymbol Interference" by H. Haroshima and H. Miyakawa; pp. 774-780; Aug. 1972; IEEE.

"New Automatic Equaliser Employing Modulo Arithmetic" by M. Tomlinson; pp. 138-139; Mar. 1971.

* cited by examiner

*Primary Examiner*—Jean B. Corrielus

(57) ABSTRACT

A decoding system to achieve rates higher than 33.6 kbps in the analog modem to digital modem direction. The decoding system modifies the standard Tomlinson Haroshima Precoding algorithm to adapt it for use in PCM modems. Instead of an arithmetic modulo operation that is implemented in the transmitter, the invention defines a Discrete Modulo Operation that performs the function of limiting the amplitude of the transmitted signal.

29 Claims, 6 Drawing Sheets

PRECODING FOR A NON-LINEAR CODEC

REFERENCE TO RELATED APPLICATIONS

This application is a continuation-in-part of U.S. application Ser. No. 09/540,475, filed on Mar. 31, 2000, which claims benefits of provisional application Ser. No. 60/169,896, filed on Dec. 9, 1999.

FIELD OF THE INVENTION

This invention relates to analog modem technology. Specifically, it proposes a new precoding scheme to achieve higher rates in the analog modem to digital modem direction.

BACKGROUND OF THE INVENTION

FIG. 8 shows the basic elements of an end-to-end transmission within the Public Switched Telephone Network (hereinafter "PSTN"). The PSTN shown includes first and second Users, first and second Central Offices, and a Switched Digital Network. Analog Subscriber Loops connect the Users to their respective Central Offices, and the Switched Digital Network connects the Central Offices together. The Analog Subscriber Loops are conventional twisted pairs that transport analog signals from the User Equipment to the associated local Central Office. At the Central Office, the analog signals are converted to 64 kbps DS0 digital data streams by a channel unit filter and codec, which together implement a bandlimiting filter followed by subsequent analog to digital conversion using a nonlinear encoding rule. The resulting DS0 streams are transported to their respective destination Central Office via the Switched Digital Network.

At the Central Office 1, User's 1 loop signal is first bandlimited. The bandlimited analog signal is then sampled at a rate of 8 ksamples/second, and then converted into an 8-bit digital representation using a nonlinear mapping rule referred to as PCM encoding. This encoding is approximately logarithmic, and its purpose is to permit relatively large dynamic range voice signals to be represented with only 8 bits per sample.

Users 1 and 2 may use a conventional modem, as shown in FIG. 9, to transmit digital data over the configuration of FIG. 8. The conventional modem encodes the user's digital data into a symbol sequence. The symbol sequence is then represented as an appropriately bandlimited analog signal which can be transmitted over the approximately 3.5–4 kHz bandwidth available on the end-to-end connection. The exemplary modem of FIG. 9 includes a Digital to Analog converter (i.e. D/A), an Analog to Digital converter (i.e. A/D), and a hybrid. The A/D and the D/A perform PCM encoding and decoding, respectively PCM baseband modulation in the upstream direction, i.e. from User 1 to the Central Office, presents special equalization problems. For instance, one potential application for PCM baseband modulation in the upstream direction is in conjunction with "56 k" modems. However, "56 k" modems have a zero in the frequency band of interest. The zero at zero frequency comes from the transformer coupling of the analog subscriber loop to the central office equipment. Therefore, telephone lines do not pass DC signals. Low frequencies near DC are also attenuated significantly as to rule out linear equalization of this channel. Moreover, it is not possible to avoid the zero at DC for 56 k modems using pass-band modulation as in the case of earlier V.34 modems because the central site modem is limited to using the sampling rate and quantization levels of the PCM codec at the central office.

One possible way to equalize this channel is to use a linear equalizer to reduce the channel response to a simpler "partial" response that still possesses the zero in the channel but can be dealt with using a non-linear technique such as maximum likelihood sequence (MLSE) decoding or decision feedback equalization (DFE). This however is only possible in the direction of digital modem to analog modem, also referred as the downstream direction. The reason this approach or any linear equalization scheme does not work in the upstream direction is that only PCM codec levels themselves can pass through the PCM codec unscathed. Any filtered version of a sequence of PCM levels will be a linear combination of these levels and in general not be a PCM level itself. When such intermediate levels are quantized by the PCM codec, quantization noise is introduced into the signal erasing any advantage over V.34 techniques.

Accordingly, there exists a need for a system capable of equalizing transmissions from an analog modem.

SUMMARY OF THE INVENTION

The inventor has recognized that one way to overcome the difficulties noted in the background of the invention is to use precoding in the transmitter, in place of MLSE or DFE in the receiver, and to use decoding in the receiver. In this way PCM levels can be used as the symbol constellation. The combination of the precoder and a linear equalizer will eliminate the inter-symbol interference (ISI) introduced by the channel. In this manner signals arriving at the PCM codec will be free of ISI and no quantization noise will be introduced.

The simplest manner of implementing precoding is to implement a feedback filter that equalizes the partial response. This however is not practical in the case where the channel and hence the partial response possesses a zero in the band of interest. The reason is that since the feedback filter equalizes the partial response, it has a very large gain at the frequency where the partial response has a zero. Components in the transmitted signal that correspond to this frequency will be greatly amplified leading to an unstable feedback loop.

Tomlinson Harashima Precoding ("THP") has emerged as an attractive solution for equalization in the presence of severe channel attenuation in the frequency band of interest; See M. Tomlinson "New Automatic Equalizer Employing Modulo Arithmetic" Electronics Letters Vol. 7, pp. 138–139, March 1971, the contents of which are incorporated herein by reference; and See H. Harashima and H. Miyakawa "Matched-Transmission Technique for Channels with Intersymbol Interference" IEEE Trans. Commun. Vol. COM–20, pp. 774–80, August 1972, the contents of which are incorporated herein by reference. THP is equivalent to Decision Feedback Equalization (DFE) in the receiver without the potential problem of error propagation.

The clever solution to the problem of very large gain at frequencies where the partial response has a zero is provided in the THP as follows. Whenever the output of the feedback loop passes a present threshold, the transmitted signal is subjected to a modulo operation which brings it back within range. This removes the instability in the feedback loop of the transmitter. The receiver must also account for the modulo operation in the transmitter. The receiver, since the modulo operation can be expressed as the subtraction of a constant, will compensate by adding the constant to the received signal. The receiver knows when to perform this compensation because whenever the transmitter subtracts the constant to bring the transmitted value to within range, the received value in the receiver will be out of range. When the receiver compensates the received signal by adding the constant, the received signal is brought back within range However, the standard THP scheme is not effective for PCM encoding in the upstream direction because the receiver can not implement the modulo compensation without introducing quantization noise. If the transmitter implements the standard THP modulo operation, then the received signal will arrive at the PCM codec with a value that corresponds to a PCM value shifted by a constant. In general it is not possible to find a set of PCM values and a constant such that each PCM value, when shifted by a constant is another PCM value. Thus THP scheme as previously defined is not effective for PCM modems.

This invention modifies the standard THP algorithm to adapt it for use in PCM modems. Instead of an arithmetic modulo operation that is implemented in the transmitter, the invention utilizes a Discrete Modulo Operation to map a constellation level outside the basic constellation of levels onto a constellation level inside the basic constellation of levels. In accordance with the invention, a precoder map the input signals in a plurality of distinct ranges onto a basic level, in the basic constellation of levels, according to different arithmetic rules. This operation limits the amplitude of the transmitted signals, hence removing the instability of the feedback loop, while ensuring that received signals at the PCM codec are always within the PCM level set free of quantization noise. Similarly, a decoder is defined for the receiver to map received PCM values correctly into the symbol constellation.

In one aspect of the invention, the precoder generates a mapped constellation signal from an input signal. The precoder includes a discrete modulo adder that generates the mapped constellation signal by mapping input signals in a plurality of distinct ranges onto a basic level. The mapping of the plurality of distinct ranges onto the basic levels follows different arithmetic rules for at least two of the distinct ranges.

In another aspect, the invention comprises a precoding method of mapping an input signal contained in a first distinct range onto a basic level according to a first arithmetic rule, and mapping an input signal contained in a second distinct range onto the basic level according to a second arithmetic rule.

BRIEF DESCRIPTION OF THE DRAWINGS

The features and advantages of the invention will be apparent from the following description, as illustrated in the accompanying Figures in which like reference characters refer to the same elements throughout the different Figures.

DETAILED DESCRIPTION OF THE INVENTION

Figure 1:
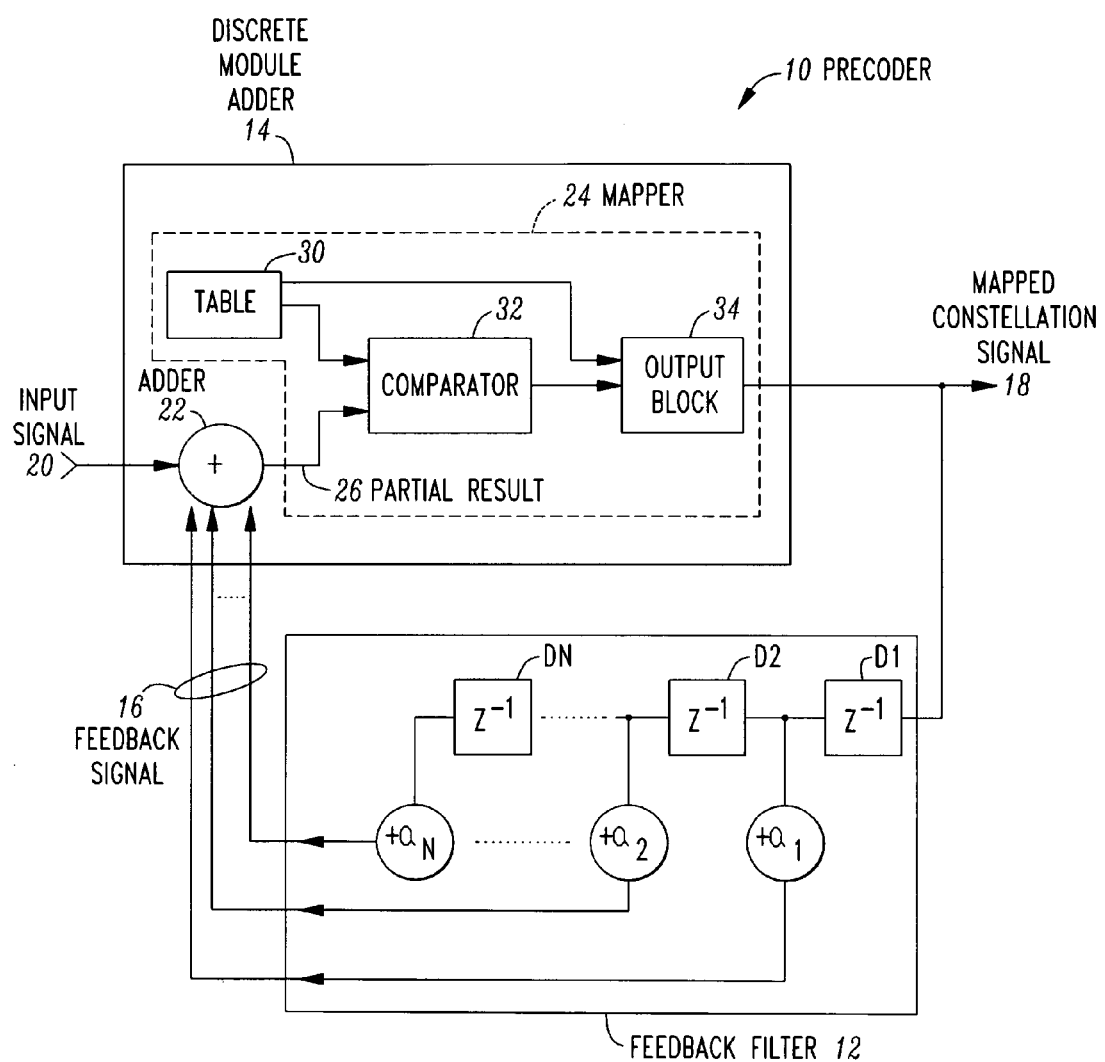
FIG. 1 is a block diagram of a precoder in accordance the present invention.

FIG. 1 illustrates a block diagram of a precoder 10. The precoder 10 includes a discrete modulo adder 14. The discrete modulo adder 14 generates a mapped constellation signal 18 from an input signal 20. The discrete modulo adder generates the mapped constellation signal 18 by mapping input signals in a plurality of distinct ranges onto a basic level. The mapping of the plurality of distinct ranges onto the basic level follows different arithmetic rules for at least two of the plurality of distinct ranges.

Figure 2:
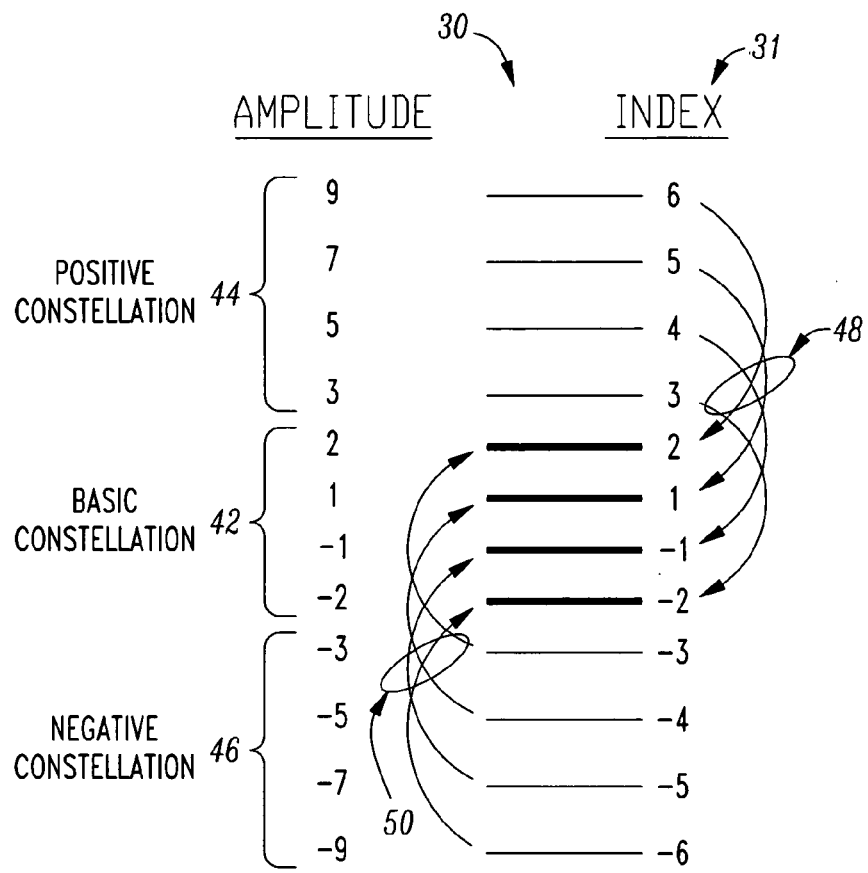
FIG. 2 is a graphical representation of an exemplary table utilized by the precoder of FIG. 1.

As shown in table 30 of FIG. 2, each of the constellations 42, 44, and 46 can include distinct ranges. For instance, the constellation 42 includes four distinct ranges (i.e. amplitude ranges 2.5 to 1.5, 1.5 to 0.5, −0.5 to −1.5, −1.5 to −2.5). The center points of each of these distinct ranges is separated by a distance of one amplitude. The constellation 44 can also includes four distinct amplitude ranges of 8 to 10, 6 to 8, 4 to 6, and 2.5 to 4; and the constellation 46 can include four distinct amplitude ranges of −8 to −10, −6 to −8, −4 to −6, and −2.5 to −4.

The discrete module adder 14 can apply a first arithmetic rule to map the distinct ranges in the constellation 42 of FIG. 2 onto signal levels, identified by indexes 31, in the constellation 42. The discrete modulo adder 14 can also apply a second arithmetic rule to map the distinct ranges in the constellation 44 of FIG. 2 onto signal levels, identified by indexes 31, in the constellation 42. The arithmetic rules needed to map distinct ranges in constellation 42 onto signal levels in the constellation 42 differ from the arithmetic rules needed to map distinct ranges in constellation 44 onto signal levels in the constellation 42. The discrete modulo adder 14 can include a processor, such as a digital signal processor, for performing various arithmetic rules.

In one aspect of the invention, the precoder 10 can also include a feedback filter 12. The feedback filter 12 generates a feedback signal 16 as a function of the mapped constellation signal 18, and the discrete modulo adder 14 generates the mapped constellation signal 18 as a function of the feedback signal 16 and as a function of the input signal 20 to the precoder 10. The discrete modulo adder can utilize an index 31 (of FIG. 2) to the constellation of levels chosen for the precoder 10, such that the amplitude of the mapped constellation signal 18 is limited.

The discrete modulo adder 14 can also include an adder 22 and a mapper 24. The adder 22 sums together the feedback signal 16 and the input signal 20 to generate a partial result 26. The mapper 24 generates the mapped constellation signal 18 by mapping a partial result 26 outside a basic constellation of levels onto the basic constellation of levels.

As further illustrated in FIG. 1, the mapper 24 can include a table 30 that identifies both the levels inside a basic constellation of levels and those levels outside a basic constellation of levels. The table 30 further identifies the mapping from levels outside the basic constellation to the levels inside the basic constellation as a function of the index 31 associated with the levels in the table 30.

Figure 5:
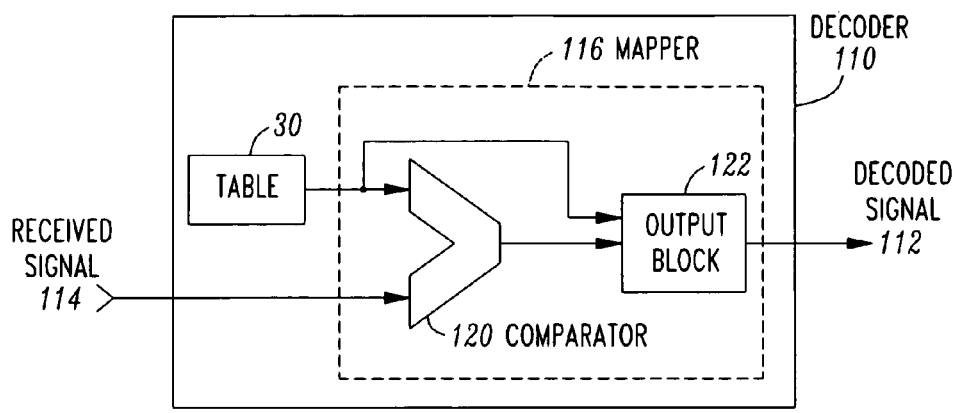
FIG. 5 is a block diagram of a decoder in accordance with the present invention.

FIG. 2 illustrates a graphical representation of an exemplary table 30 utilized by the precoder 10 of FIG. 1 and by a decoder 110 in FIG. 5. The exemplary table 30 has a total of 12 levels, each level being identified by a horizontal line. The table 30 also includes two columns, one labeled Amplitude and another labeled Index 31. The Amplitude column has 12 entries, one for each level. The Index column also has 12 entries, one for each level. Thus, as shown in FIG. 2, amplitude 9 and index 6 are both associated with the first level; amplitude 7 and index 5 are both associated with the second level; amplitude 5 and index 4 are both associated with the third level; . . . and amplitude −9 and index −6 are both associated with the twelfth level.

The levels in the exemplary table 30 can also be subdivided into three separate constellations: a basic constellation 42, a positive constellation 44, and a negative constellation 46. The basic constellation 42 extends into both the positive and negative directions from an amplitude level of zero. Typically, the basic constellation extends an equal distance from amplitude zero into both the positive and negative directions. The positive constellation 44 extends from the maximum level of the basic constellation upwards, and the negative constellation 46 extends from the minimum level of the basic constellation downwards. For example, as shown in FIG. 2, the basic constellation includes the amplitudes $\{2,1,-1,-2\}$, or alternatively the basic constellation includes the indexes $\{2,1,-1,-2\}$. The positive constellation includes the amplitudes $\{3, 5, 7, 9\}$ or the indexes $\{3, 4, 5, 6\}$. The negative constellation includes the amplitudes $\{-3, -5, -7, -9\}$ or the indexes $\{-3, -4, -, -6\}$. In a preferred embodiment of the invention, the basic constellation includes a set of indexes extending from $-k$ to $k$; the positive constellation includes a set of indices extending from $k+1$ to $3k$; and the negative constellation includes a set of indices extending from $-k-1$ to $-3k$.

The amplitude entries show that the separation between levels in the table may vary, as is found in PCM codec levels. The separation between levels in the exemplary basic constellation 42 of FIG. 2 equals one amplitude, while the separation between levels in the exemplary positive constellation 44 equals two amplitudes. Thus, the positive constellation 44 ranges from amplitude level 2.5 to amplitude level 10; the negative constellation 46 ranges from amplitude level −2.5 to −10; and the basic constellation 42 ranges from amplitude level 2.5 to −2.5.

In a preferred embodiment of the invention, the separation between indexes is a constant, regardless of the constellation. As shown in FIG. 1, the index separation between successive levels always equals one. Accordingly, although the difference in amplitude between the successive levels shown in FIG. 2 may vary, the difference in index between successive levels is a constant.

The exemplary table 30 of FIG. 2 also uses a first set of arrows 48 to show a mapping from levels in the positive constellation 44 to levels in the basic constellation 42. A second set of arrows 50 shows a mapping from levels in the negative constellation 46 to levels in the basic constellation 42. The first set of arrows 48 identifies that the levels associated with indexes $\{3,4,5,6\}$ in the positive constellation are mapped to the levels associated with indexes $\{-2-1,1,2\}$ in the basic constellation, respectively. The second set of arrows 50 identifies that the levels associated with indexes $\{-3,-4,-5,-6\}$ in the negative constellation are mapped to the levels associated with indexes $\{2,1,-1,-2\}$ in the basic constellation, respectively. Thus, there is a one-to-one mapping from levels in the positive constellation 44 to levels in the basic constellation 42, and there is another one-to-one mapping from levels in the negative constellation 46 to levels in the basic constellation 42.

The mapping arrows 48 and 50 also show that a plurality of distinct ranges can be mapped onto a basic level. For instance, distinct amplitude range 8 to 10 (i.e. index level 6) in constellation 44 maps to index level 2 in constellation 42, distinct amplitude range −2.5 to −4 (index level −3) also maps to index level 2; and distinct amplitude range 1.5 to 2.5 also maps to index level 2. In other words the distinct signal ranges 8 to 10, −2.5 to −4, and 1.5 to 2.5 all map onto the same basic index level 2.

The mapping of these distinct ranges onto index level 2 are mapped according to different arithmetic rules. A first arithmetic rule maps the distinct amplitude range 8 to 10 onto the basic index level 2, and a second arithmetic rule maps the distinct amplitude range 1.5 to 2.5 onto the basic index level 2.

As shown in FIG. 2, an exemplary first arithmetic rule partitions the basic constellation 42 into four different signal levels being separated by a distance of one amplitude. The first arithmetic rule can also index the partitioned basic constellation 42 with the indexes 2,1,−1,−2. The amplitude ranges in the basic constellation 42 are then mapped onto the signal levels by adding a constant of zero to the indexes.

An exemplary second arithmetic rule partitions the positive constellation 44 into four different signal levels being separated by a distance of two amplitudes. The second arithmetic rule can also index the partitioned positive constellation 44 with the indexes 3,4,5,6. The amplitude ranges in the positive constellation 44 are then mapped onto the signal levels by adding a constant to the indexes. Further details on the mapping of the positive constellation 44 and the negative constellation 46 onto the basic constellation 42 are given below.

In accordance with another aspect of the invention, each of the levels in the positive constellation are mapped onto levels in the basic constellation based on the indexing system chosen. This form of mapping between the basic constellation and those levels outside the basic constellation, based upon the indexes in the constellation, will be referred to as a discrete modulo operation. Preferably, the discrete modulo operation is defined as a shift operation between the indexes in the basic constellation and the indexes outside the basic constellation (i.e. the positive constellation 44 and the negative constellation 46). The shift operation can be implemented by adding a constant J to an index associated with a level outside the basic constellation.

An exemplary shift operation is as follows:

if the indexes in the basic constellation are labeled, basic_const, where basic_const goes from −k to k, and if the indexes in the positive constellation are labeled positive_const, where positive_const goes from k+1 to 3k, then the levels in the positive constellation 44 are mapped onto levels in the basic constellation 42 according to the equations:

Index positive_const→positive_const−(2*k); while positive_const>2k; and

Index positive_const→positive_const−(2*k)−1; while positive_const<=2k;

Wherein→identifies the mapping function.

For example, the basic constellation might include the indexes $\{-2,-1,1,2\}$ and the positive constellation might includes the indexes $\{3,4,5,6\}$. Given this set of constellations, the mapping is calculated as follows:

index 6 maps to 6−(2*k)=6−4=2;

index 5 maps to 5−(2*k)=5−4=1;

index 4 maps to 4−(2*k)−1=4−4−1=−1; and index 3 maps to 3−(2*k)−1=3−4−1=−2.

In this example, the constant J=2*k for the subset of levels {5,6} and the constant J=2*k−1 for the subset of levels {3,4}.

In an analogous fashion, the indexes in the negative constellation can be mapped onto levels in the basic constellation:

if the indexes in the basic constellation are labeled, basic_const, where basic_const goes from −k to k, and if the indexes in the negative constellation are labeled negative_const, where negative_const goes from −k−1 to −3k, then the levels in the negative constellation 46 are mapped onto levels in the basic constellation 42 according to the equations:

Index negative_const→negative_const+(2*k); while negative_const<−(2k); and

Index negative_const→negative_const+(2*k)+1; while negative_const>=−(2k);

Wherein→identifies the mapping function.

This discrete modulo operation performs the function of limiting the amplitude of signals by mapping signals in the table outside the basic constellation onto signals inside the basic constellation. This mapping function allows the precoder 10 (and the decoder 110 of FIG. 5) to remove the potential instability caused by the feedback filter 12. This completes the description of the basic elements of table 30, as shown in FIGS. 1 and 2.

With further reference to FIG. 1, the mapper 24 can also include a comparator 32 and an output block 34. The comparator 32 compares the partial result 26 with levels in the table 30. For instance, the comparator can identify the level in table 30 closest to the partial result 26.

The output block 34 generates the mapped constellation signal 18. The mapped constellation signal 18 is within the range of the basic constellation even though the partial result may be a level outside the basic constellation. In particular, the mapped constellation signal 18 output by the block 34 is equal to the partial result 26 if the identified level is inside the basic constellation. Alternatively, if the identified level is outside the basic constellation, then the mapped constellation signal 18 is set equal to the sum of the partial result and a mapping distance signal. The mapping distance signal equals the distance between the index basic_const, associated with the basic constellation level of the input signal, and the index positive_const, associated with a level outside the basic constellation that is anticipated at the receiver. Further details on determining the mapping distance are discussed under the description of FIG. 4.

FIG. 1 also illustrates details of the feedback filter 12. The feedback filter can include one or more delay elements D1, D2, . . . , DN, and the feedback filter can include one or more weighting elements a1, a2, . . . , aN. The feedback filter 12 thus provides feedback connections whose weighting coefficients are a1, a2, . . . , aN. The feedback filter 12 can be used to model the partial response of a communication channel over which the input signal 20 is transmitted.

Figure 3:
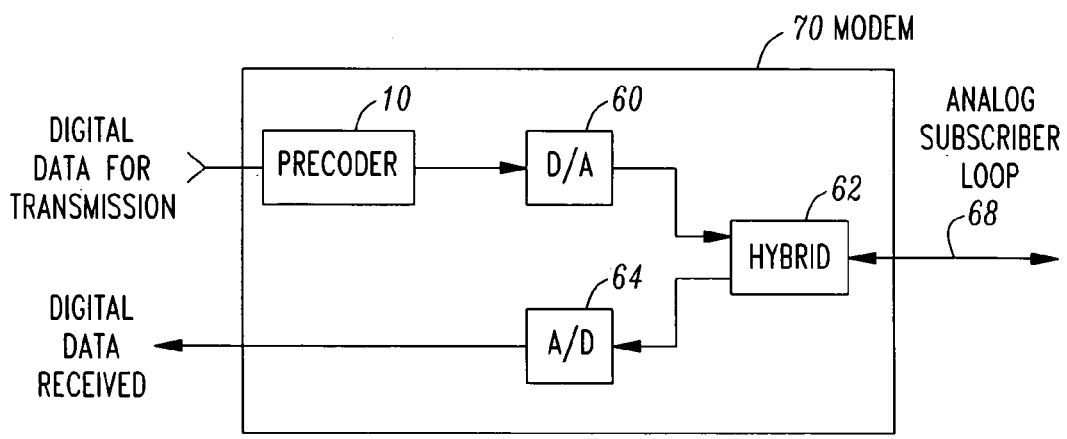
FIG. 3 is a simplified block diagram illustrating the precoder of FIG. 1 in a modem.

FIG. 3 is a simplified block diagram illustrating the precoder 10 of FIG. 1 in a modem 70. The modem 70 includes the precoder 10, a digital to analog converter 60 ("D/A"), a hybrid 62, and an analog to digital converter 64 ("A/D"). An analog subscriber loop 68 operably couples the modem 70 to a PSTN.

The hybrid 62 operably couples the modem 70 to the analog local loop 68. A hybrid can generally be described as a passive device used for converting a dual analog signal that is carried on one pair of conductors (i.e. the analog local loop) to separate analog signals that are carried on two pairs of conductors. Those skilled in the art are familiar with the use and operation of hybrid devices and, thus, a detailed description thereof is not necessary to enable one of skill in the art to make and practice the present invention The D/A converts digital signals to analog signals for transmission over the analog local loop, and the A/D converts analog signal received from the analog local loop to digital signals. The A/D converter and the D/A converter can also be described as capable of implementing a CODEC (coder/decoder) function. In one embodiment of the invention, the A/D implements a mu-law CODEC. Those skilled in the art are familiar with the non-linear mu-law and A-law signal compression algorithms. The mu-law algorithm includes 255 discrete signal conversion values; A-law uses 256 values. The broad principles of the invention are not, however, limited to a specific quantization scheme.

Figure 4:
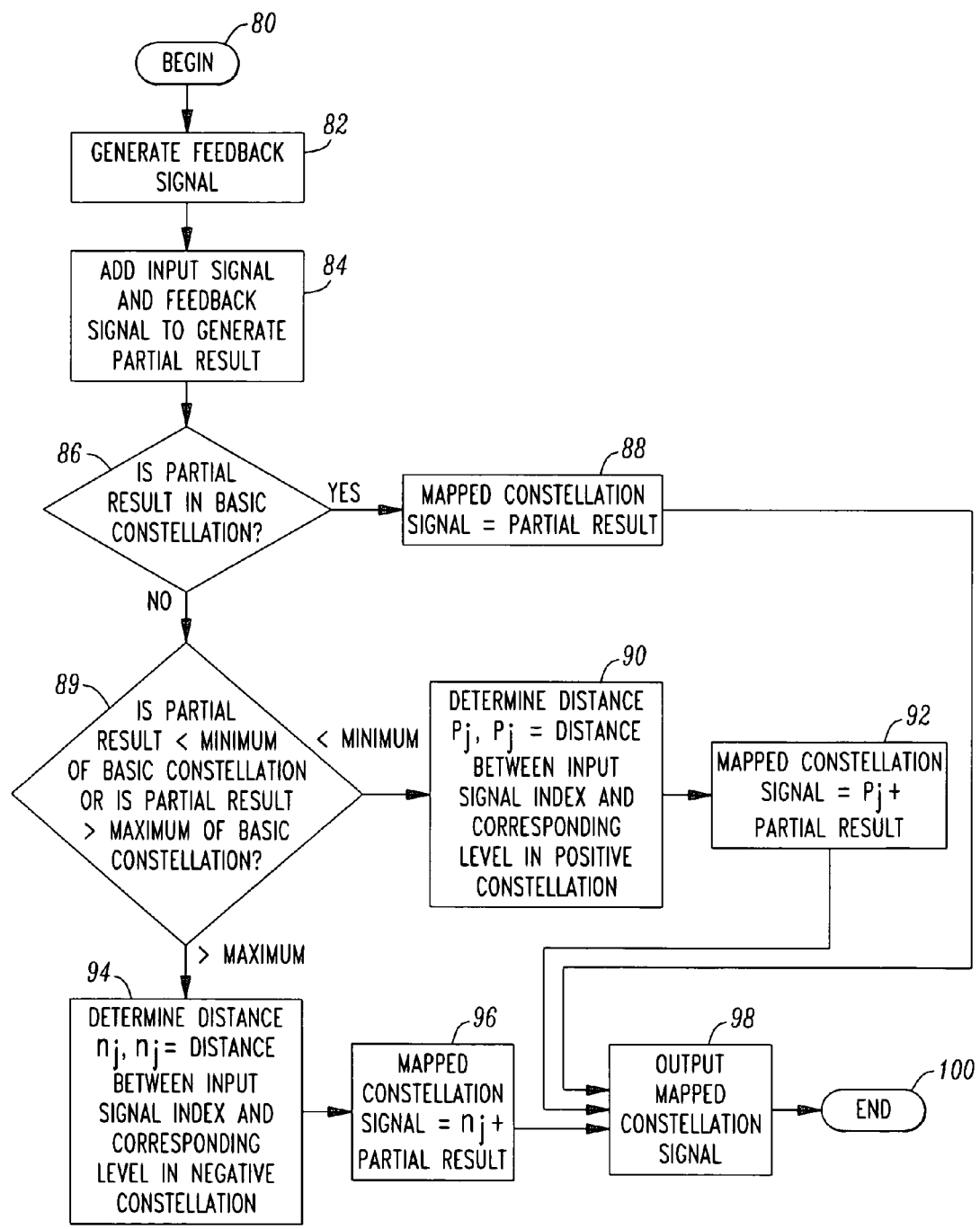
FIG. 4 is a flow chart illustrating the precoding method in accordance with the present invention.

FIG. 4 is a flow chart illustrating the method of precoding an input signal to generate a mapped constellation signal, in accordance with the present invention. The method includes the steps of mapping an input signal contained in a first distinct range onto a basic level according to a first arithmetic rule (steps 86, 88, 98, 100), and mapping a received signal contained in a second distinct range onto the basic level according to a second arithmetic rule (steps 89–100).

The method can also include the steps of generating a feedback signal from the mapped constellation signal at step 82, and performing a discrete modulo operation on the feedback signal and the input signal at steps 86–100. The discrete modulo operation can be based upon an index to the constellation of levels chosen for the precoder, such that the amplitude of the mapped constellation signal is limited.

FIG. 4, also shows that the discrete modulo operation can include the steps of adding together the input signal and the feedback signal to generate a partial result at step 84, determining whether the generated partial result is contained within a basic constellation of levels at step 86, and generating the mapped constellation signal by mapping a partial result outside the basic constellation of levels onto a level inside the basic constellation of levels as a function of the index to the levels, at steps 89–100.

In particular, at step 86 the method determines whether the partial result calculated in step 84 is within the range of the basic constellation 42. This can be implemented by comparing the partial result to entries in the table 30. If the partial result is within the basic constellation range 42, then processing proceeds to step 88, otherwise processing proceeds to step 89.

At step 88, the mapped constellation signal is set equal to the partial result 88. For instance, if the partial result is within the basic constellation, then feedback has not caused the partial result to be out of range and accordingly no mapping is required. After step 88, processing proceeds to step 98.

At step 89, the method determines whether the partial result is less than the minimum of the basic constellation or whether the partial result is greater than the maximum of the basic constellation. If the partial result is less than the minimum of the basic constellation, then the method branches to step 90. If the partial result is greater than the maximum of the basic constellation, then the method branches to step 94.

At step 90, the method determines the mapping distance $p_j$. The mapping distance $p_j$=the difference in amplitude between an index positive_const and the index basic_const. The index basic_const is the index associated with the basic constellation level of the input signal, and the index positive_const is an index associated with a level found in the positive constellation 44 of FIG. 2. In particular, the index positive_const is the index in the positive constellation 44 that maps onto the basic constellation level of the input signal. The index positive_const can be obtained from the table 30. After step 90, processing proceeds to step 92.

At step 92, the mapped constellation signal is set equal to the sum of the mapping distance $p_j$ and the partial result. After step 92, processing proceeds to step 98.

At step 94, which is reached from step 89, the method determines the mapping distance $n_j$. The mapping distance $n_j$=the difference in amplitude between an index negative_const and an index basic_const. The index basic_const is the index associated with the basic constellation level of the input signal, and the index negative_const is an index associated with a level found in the negative constellation 46 of FIG. 2. In particular, the index negative_const is the index in the negative constellation 46 that maps onto the basic constellation level of the input signal. The index negative_const can be obtained from the table 30. After step 94, processing proceeds to step 96.

At step 96, the mapped constellation signal is set equal to the sum of the mapping distance $n_j$, which is a negative quantity, and the partial result. After step 96, processing proceeds to step 98.

At step 98, the precoder 10 outputs the mapped constellation signal 18. At step 100, the method ends.

FIG. 5 shows a block diagram of a decoder 110 for generating a decoded signal 112 from a received signal 114. The decoder 110 includes a mapper 116. The mapper generates the decoded signal 112 by mapping received signals in a plurality of distinct ranges (i.e. amplitude ranges 8 to 10, −2.5 to −4, and 1.5 to 2.5) onto a basic level (i.e. index level 2 of FIG. 2). The mapping of the plurality of distinct ranges onto the basic level follows different arithmetic rules for at least two of the plurality of distinct ranges. The decoder 110 can be located in a digital modem, preferably, the digital modem is at a central location of telecommunication service provider.

As shown in table 30 of FIG. 2, each of the constellations 42, 44, and 46 can include distinct ranges. For instance, the constellation 42 includes four distinct ranges (i.e. amplitude ranges 2.5 to 1.5, 1.5 to 0.5, −0.5 to −1.5, −1.5 to −2.5). The center points of each of these distinct ranges is separated by a distance of one amplitude. The constellation 44 includes four distinct amplitude ranges of 8 to 10, 6 to 8, 4 to 6, and 2.5 to 4; and the constellation 46 includes four distinct amplitude ranges of −8 to −10, −6 to −8, −4 to −6, and −2.5 to −4.

The mapper 116 can apply a first arithmetic rule to map the distinct ranges in the constellation 42 onto signal levels, identified by indexes 31, in the constellation 42. The mapper 116 can also apply a second arithmetic rule to map the distinct ranges in the constellation 44 onto signal levels, identified by indexes 31, in the constellation 42. The arithmetic rules needed to map distinct ranges in constellation 42 onto signal levels in the constellation 42 differ from the arithmetic rules needed to map distinct ranges in constellation 44 onto signal levels in the constellation 42. These arithmetic rules can differ because the partitioning of amplitude ranges into received signal levels for one constellation (e.g. constellation 42) can differ from the partitioning of amplitude ranges into received signal levels for another constellation (e.g. constellation 44). The mapper can includes a processor, such as a digital signal processor, for performing the operations necessary to partition the constellations and to map the received levels onto levels in the basic constellation 42 in accordance with various arithmetic rules.

The mapper 116 can map at least a subset of the levels outside the basic constellation (i.e. constellations 44, 46) onto levels inside the basic constellation 42 by adding a constant J to an index 31, of FIG. 2, associated with the subset of levels outside the basic constellation.

As illustrative example of the mapping function based upon the addition of a constant J to an index 31 is shown in FIG. 2. The illustrated positive constellation 44 includes the signal levels having indexes {3,4,5,6} and the basic constellation 42 shown includes the signal levels having indexes {−2,−1,1,2}. The positive constellation 44 can be subdivided into two subsets of indexes: {3,4} and {5,6}. For the first subset, {3,4}, the constant J=2*k−1; and for the second subset, {5,6}, the constant J=2*k; wherein k is also a constant. If k is set equal to −2, then:
for the first subset J=2*(−2)−1=−5, and
for the second subset J=2*(−2)=−4.

Accordingly, for the first subset, 3 maps to 3+(−5)=−2, and 4 maps to 4+(−5)=−1. For the second subset, 5 maps to 5+(−4)=1, and 6 maps to 6+(−4)=2. Thus indexes {3,4}→{−2, −1} by adding a constant J=−5, and indexes {5,6}→{1,2} by adding a constant J=−4; wherein "→" designates a mapping function.

The constant J can be characterized as a constant that depends upon whether the level of the received signal is inside or outside the basic constellation 42 of received signal levels. For instance, if the received signal level is inside the basic constellation, then J=0. That is, the index of the received signal level is not modified by the addition of the constant J. In comparison, if the received signal level is outside the basic constellation, then J might be set equal to −4. This would cause the index of received signal levels outside the basic constellation to be mapped onto the index of a signal level inside the basic constellation of signal levels.

Another feature of the invention provides for a mapper 116 that maps each level outside the basic constellation of levels 44, 46 onto only one level inside the basic constellation of levels 42. FIG. 2 illustrates and describes a table 30 that provides for such a one-to-one mapping from levels outside the basic constellation of levels to levels inside the basic constellation of levels.

As further illustrated in FIG. 5, the decoder 110 can include the table 30 of FIG. 2 operably coupled with the mapper 116. The table 30 identifies the basic constellation of received signal levels and the mapping from the received signal levels outside the basic constellation to the received signal levels inside the basic constellation. The mapping in table 30 can be based upon an index 31 associated with the levels outside the basic constellation of received signal levels.

The mapper 116 of FIG. 5 can also include a comparator 120 operably coupled to the table 30. The comparator generates an output signal identifying the index 31 closest to the received signal level 114.

The mapper 116 can also include an output block 122 operably coupled with the comparator 120 and the table 30. If the index of the received signal level 114 is within the basic constellation 42 of received signal levels, then the output block generates a decoded signal 112 corresponding to the index 31 closest to the received signal level. If the index of the received signal level 114 is outside the basic constellation 42 of received signal levels, then the output block 122 generates a decoded signal 112 corresponding to the sum of the index associated with the received signal level and a constant J. That is, the output block adds a constant J to the index associated with the received signal level 114 in order to generated a mapped index signal. The output block then outputs the received signal level corresponding to the mapped index signal.

Figure 6:
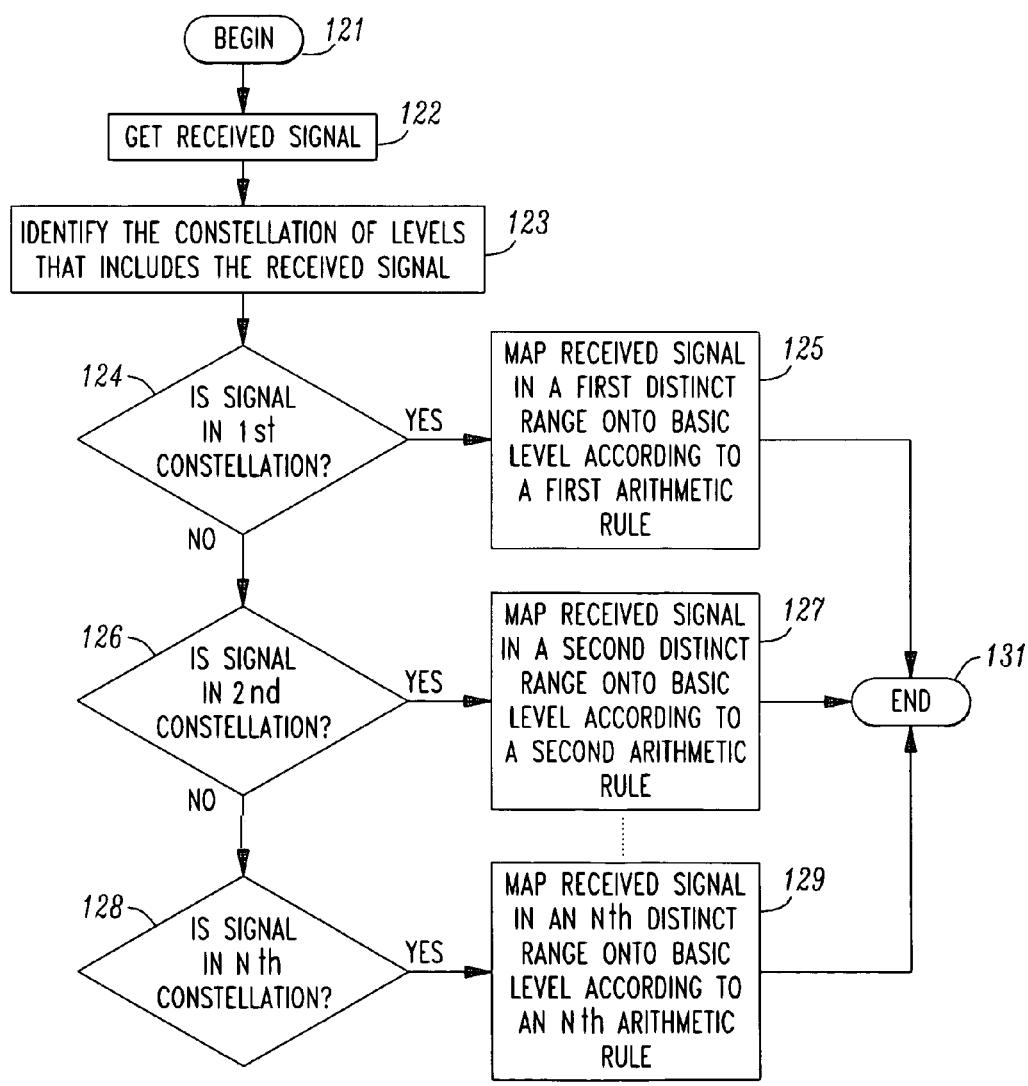
FIG. 6 is a flow chart illustrating a decoding method in accordance with the invention.

FIG. 6 is a flow chart illustrating a method of decoding the received signal 114 to generated the decoded signal 112, in accordance with the present invention. The method includes the steps of mapping a received signal contained in a first distinct range onto a basic level according to a first arithmetic rule (step 125), and mapping a received signal contained in a second distinct range onto the basic level according to a second arithmetic rule (step 127).

In particular, the method begins at step 121. At step 122 the received signal 114 is obtained from the digital network. Afterwards, at step 123, the decoder 110 identifies the constellation of levels that includes the received signal 114. For example, the decoder 110 determines whether the received signal is in a first, second, or third constellation of levels. After step 123, processing proceeds to step 124.

At step 124, the decoder 110 branches processing of the received signal to step 125 if the received signal is in an identified first constellation. At step 126 the decoder 110 branches processing of the received signal to step 127 if the received signal is in an identified second constellation, and at step 128 the decoder 110 branches processing of the received signal to step 129 if the received signal is in an identified $N^{th}$ constellation. The decoder 110 can determine which constellation the received signal level is contained within by comparing the received signal level to the table 30 of FIG. 2.

At step 125, the decoder 110 maps the received signal in a first distinct amplitude range onto a basic level according to a first arithmetic rule. The basic level can be contained, for example, in the basic constellation 42 of FIG. 2. At step 127, the decoder 110 maps the received signal in a second distinct amplitude range onto a basic level according to a second arithmetic rule; and at step 129, the decoder 110 maps the received signal in an $N^{th}$ distinct amplitude range onto a basic level according to an $N^{th}$ arithmetic rule. After steps 125, 127, and 129 processing ends at step 131.

Figure 7:
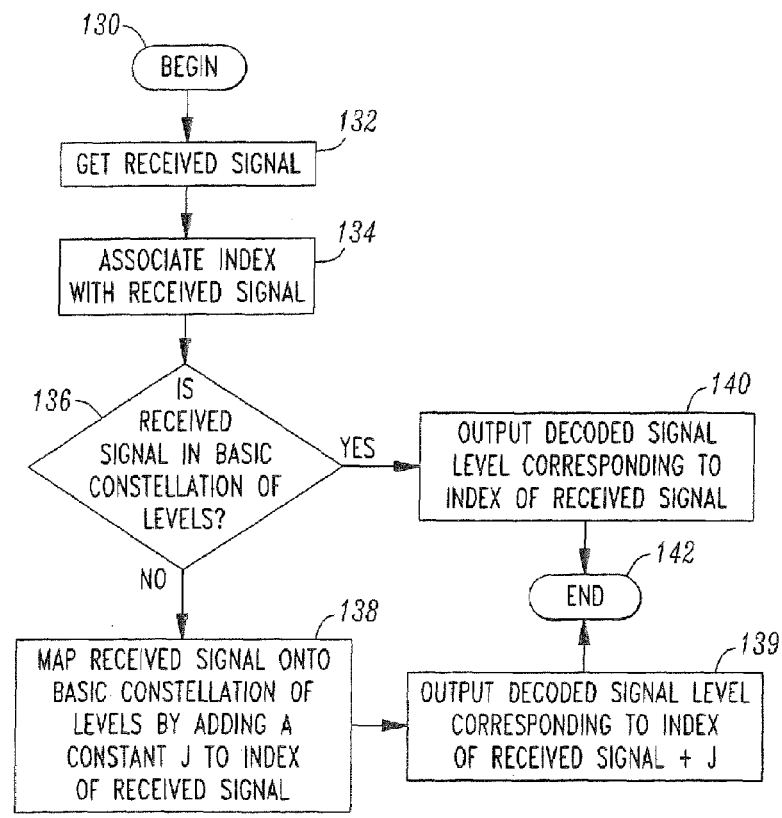
FIG. 7 is a flow chart illustrating a more specific decoding method in accordance with the invention.
Figure 8:
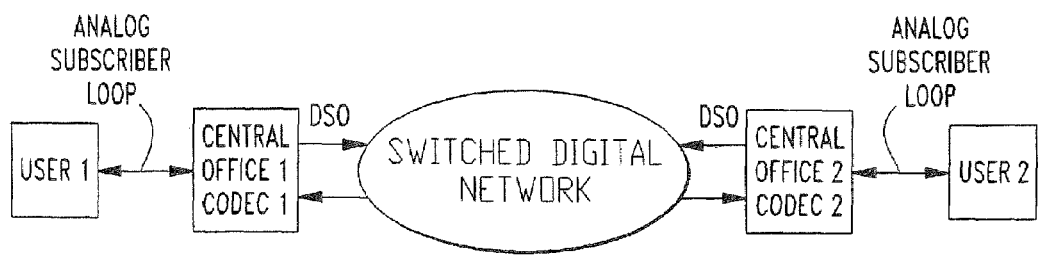
FIG. 8 is a block diagram of a conventional Public Switched Telephone Network.
Figure 9:
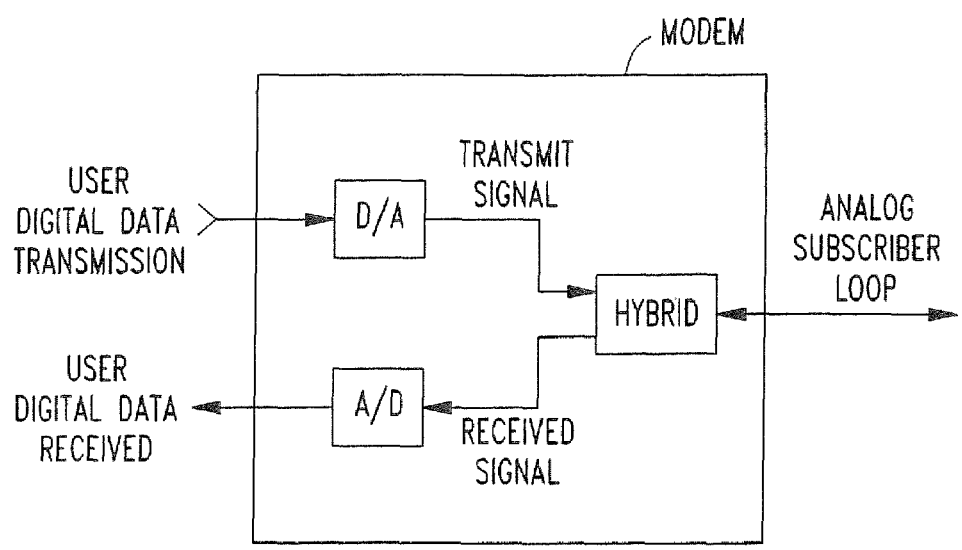
FIG. 9 is a block diagram of a conventional modem.

FIG. 7 is a flow chart illustrating a more specific method of decoding the received signal 114 to generate the decoded signal 112, in accordance with the present invention. The method includes mapping a received signal outside the basic constellation of received signal levels onto a level inside the basic constellation of received signal levels. In one aspect of the invention, at least a subset of the levels outside the basic constellation of received signal levels are mapped onto levels inside the basic constellation as a function of an index associated with the subset of levels. Particularly, the subset of levels outside the basic constellation can be mapped by adding a constant J to an index associated with the received signal level outside the basic constellation of levels.

In particular, the method begins at step 130. At step 132 the received signal 114 is obtained from the digital network. After step 132, processing proceeds to step 134.

At step 134, the decoder 110 associates an index 31 with the received signal. The decoder 110 can use the comparator 120 and the table 30 to associate an index 31 with the received signal. The comparator 120 can access the table 30 to identify the amplitude level in the table closest to the received signal. The index associated with the identified amplitude level in the table 30 can then be associated with the received signal 114.

At step 136, the decoder 110 determines whether the received signal 114 is inside or outside the basic constellation or levels. If the received signal 114 is inside the basic constellation of levels, then processing proceeds to step 140. If the received signal 114 is outside the basic constellation of levels, then processing proceeds to step 138.

At step 138, the decoder 110 maps the received signal onto the basic constellation of levels 42. The received signal 114 is mapped onto the basic constellation by adding a constant J to the index associated with the received signal level. The sum of the constant J and the index associated with the received signal level is called the mapped index signal. After step 138, processing proceeds to step 139.

At step 139, the decoder outputs the decoded signal 112 corresponding to the mapped index signal. After step 139, processing proceeds to step 142.

At step 140, the decoder outputs the decoded signal 112 corresponding to the index of the received signal. After step 140, processing ends at step 142.

Processing ends at step 142.

Exemplary Operation of the Precoding Method:

A) Let's say the desired sequence to be transmitted is: 2, −2, −2, 2, 1, −1, −2, 2

B) Let's also assume that our feedback filter coefficients are 1 and −1 so what is to be transmitted is the current input signal minus the previously transmitted sample, then C) With the first input signal=2, then the first output of the adder 22 (i.e. the partial result signal 26) is:

2−0=2 which is in range so it is transmitted as 2.

D) With the second input signal=−2, then the second output of the adder 22 (i.e. the partial result signal 26) is:

−2−2=−4

This value is out of range of the basic constellation 42, so it must undergo the discrete modulo operation outlined in steps 89–96 of FIG. 4. Using the table shown in FIG. 2, we can identify that when the input signal=−2 the corresponding index in the positive constellation 44 is 3. Thus:

$p_j$=difference in amplitude between the index associated with a level in the positive constellation that maps onto the basic constellation level of the input signal and the index of the input signal, and accordingly $p_j$=absolute value of [(3)−(−2)]=5.

Then, in accordance with step 92, the mapped constellation signal=$p_j$+partial result=5+(−4)=1.

So the second transmitted value is 1.

E). With the third input signal=−2, then the first output of the adder 22 (i.e. the partial result signal 26) is:

−2−1=−3.

This value is out of range of the basic constellation 42, so it must undergo the discrete modulo operation outlined in steps 89–96 of FIG. 4. Using the table shown in FIG. 2, we can identify that when the input signal=−2 the corresponding index in the positive constellation 44 is 3. Thus:

$p_j$=difference in amplitude between the index associated with a level in the positive constellation that maps onto the basic constellation level of the input signal and the index of the input signal, and accordingly $p_j$=absolute value of [(3)−(−2)]=5.

Then, in accordance with step 92, the mapped constellation signal=$p_j$+partial result=5+(−3)=2.

So the second transmitted value is 2.

F) The fourth input signal is 2, and the output of the adder 22 (i.e. the partial result signal 26) is:

2−2=0 which is in range so it is transmitted as 0.

G) The fifth input signal is 1, and the output of the adder 22 (i.e. the partial result signal 26) is:

1−0=1 which is in range so it is transmitted as 1.

H) The sixth input signal is −1, and the output of the adder 22 is:

−1−1−2 which is in range so it is transmitted as −2.

Whenever a receiver in a digital modem receives a level in the positive or negative constellations, it maps the level to the corresponding level in the basic constellation as identified in the table 30. This mapping in the receiver can be formulated as a shift operation that is dependent on the level being transmitted. If the difference between the level in the basic constellation and the corresponding level in the negative constellation is $n_j$, then the mapping in the receiver from the negative constellation can be thought of as an addition of offset $n_j$ to the received value. Thus, if we completed the above example by showing the response in the receiver, we get the following:

| | |
|---|---|
| Transmitted Symbol Sequence | . . . 2, −2, −2, 2, 1, −1 . . . |
| Partial Result | . . . 2, −4, −3, 0, 1, 2 . . . |
| What is xmitted | . . . 2, 1, 2, 0 ,1, −2 |
| Output of comm. Channel (i.e. what is received) | . . . 2, 3, 3, 2, 1, −1 |
| After Receiver mapping to basic constellation | . . . 2, −2, −2, 2, 1, −1 |

Having thus described a few particular embodiments of the invention, various alterations, modifications, and improvements will readily occur to those skilled in the art. Such alterations, modifications and improvements as are made obvious by the disclosure are intended to be part of this description though not expressly stated herein, and are intended to be within the spirit and scope of the invention. Accordingly, the foregoing description is by way of example only, and is not limiting.

What is claimed is:

1. A precoder for generating a mapped constellation signal from an input signal, comprising:
a discrete modulo adder that generates the mapped constellation signal from the input signal by mapping input signals in a plurality of distinct ranges, including a first distinct range and a second distinct range, onto a basic level to limit an amplitude of the mapped constellation signal, wherein the mapping of the plurality of distinct ranges onto the basic level follows different arithmetic rules for at least two of the plurality of distinct ranges, an arithmetic rule being selected based on a value of the input signal, and wherein the first distinct range forms part of a first constellation having a plurality of signal levels some of which are separated by a distance D1 and the second distinct range forms part of a second constellation having a plurality of signal levels some of which are separated by a distance D2 that differs from D1.

2. The precoder according to claim 1, wherein the first and second constellations form a subset of the levels in a standard mu-law or A-law PCM decoding table.

3. The precoder according to claim 1, wherein a first arithmetic rule of the discrete modulo adder maps the first distinct range onto the basic level by partitioning the first constellation into a plurality of signal levels, some of the signal levels being separated by the distance D1.

4. The precoder according to claim 3, wherein the first arithmetic rule of the discrete modulo adder also indexes the partitioned first constellation to generate a plurality of indexes and maps the partitioned first constellation onto a basic constellation of levels as a function of the indexes.

5. The precoder according to claim 4, wherein the discrete modulo adder maps the partitioned first constellation onto the basic constellation of levels by adding a constant J to the indexes.

6. The precoder according to claim 5, wherein the value of the off set J depends on whether the level of the input signal is inside or outside the basic constellation of levels.

7. The precoder according to claim 1, wherein a second arithmetic rule of the discrete modulo adder maps the second distinct range onto the basic level by partitioning the second constellation into a plurality of signal levels, some of the signal levels being separated by the distance D2.

8. The precoder according to claim 1, wherein the basic level is one level within a basic constellation of levels and wherein the discrete modulo adder maps each distinct range onto only one level inside the basic constellation of levels, such that a many-to-one mapping is created from each distinct range to a level inside the basic constellation of levels.

9. The precoder according to claim 1, wherein the precoder further comprises: a feedback filter that generates a feedback signal as a function of the mapped constellation signal, and wherein the discrete modulo adder includes a summer for adding the input signal and the feedback signal to generate a partial result, and a mapper that generates the mapped constellation signal from the partial result.

10. The precoder according to claim 9, wherein the mapper generates the mapped constellation signal by mapping the partial result onto a basic constellation of levels as a function of an index to a constellation of levels, such that the amplitude of the mapped constellation signal is limited.

11. The precoder according to claim 9, wherein the feedback filter includes a delay element and a weighting element such that the feedback filter multiplies a delayed version of the mapped constellation signal by the weighting element to generate the feedback signal.

12. The precoder according to claim 9, wherein the mapper further comprises: a table identifying a basic constellation of levels and a mapping from levels outside the basic constellation to levels inside the basic constellation.

13. The precoder according to claim 12, wherein the table has:
a constellation index basic_const, where basic_const goes from 1 to a constant k, associated with each of a plurality of levels inside the basic constellation, and having a constellation index positive_const, where positive_const goes from k+1 to 3k, associated with a plurality of levels outside the basic constellation.

14. The precoder according to claim 13, wherein each of the plurality of levels outside the basic constellation index are mapped onto a level inside the basic constellation according to the equation:

index positive_const→positive_const−(2*k); while positive_const>2k; and index positive_const→positive_const−(2*k)−1; while positive_const<=2k;

wherein→identifies the mapping function.

15. The precoder according to claim 12, wherein the mapper further comprises a comparator for comparing the partial result with the levels in the table.

16. The precoder according to claim 12, wherein the mapper further includes an output block that generates a mapped constellation signal equal to a level inside the basic constellation, if an identified level in the table closest to the partial result is inside the basic constellation.

17. The precoder according to claim 9, wherein the mapper further includes an output block that includes a summer for adding the partial result and a mapping distance signal, wherein the mapping distance signal equals the difference between an index positive_const, associated with a level outside a basic constellation, and an index basic_const, associated with a basic constellation level of the input signal.

18. A method of preceding input signal to generate a mapped constellation signal for transmission, comprising:
generating said mapped constellation signal from said input signal; said generating step comprising:
mapping said input signal when contained in a first distinct range onto a basic level according to a first arithmetic rule to limit an amplitude of the mapped constellation signal, wherein the first arithmetic rule is selected based on the input signal being in the first distinct range, and mapping said input signal when contained in a second distinct range onto the basic level according to a second arithmetic rule that differs from the first arithmetic rule, wherein the second arithmetic rule is selected based on the input signal being in the second distinct range and wherein the first distinct range forms part of a first constellation and mapping the input signal in the first distinct range onto the basic level includes partitioning the first constellation into a plurality of signal levels, some of the signal levels being separated by distance D1 and the second distinct range forms part of a second constellation having a plurality of signal levels some of which are separated by a distance D2 that differs from D1 and wherein the mapped constellation signal reduces noise associated therewith when received.

19. The method according to claim 18, further including the step of indexing the first constellation to generate a plurality of indexes and mapping a partitioned first constellation onto a basic constellation of levels as a function of the indexes.

20. The method according to claim 19, further including the step of mapping the partitioned first constellation onto the basic constellation of levels by adding a constant J to the indexes.

21. The method according to claim 18, wherein the basic level is one level within a basic constellation of levels and wherein the mapping steps map each distinct range onto only one level inside the basic constellation of levels, such that a many-to-one mapping is created from each distinct range to a level inside the basic constellation of levels.

22. The method according to claim 18, further comprising the step of generating a feedback signal from the mapped constellation signal.

23. The method according to claim 22, further comprising the steps of:
adding together the input signal and the feedback signal to generate a partial result, and
determining whether the generated partial result is contained within a basic constellation of levels.

24. The method according to claim 19, further comprising the step of generating the mapped constellation signal by mapping a partial result, generated by adding together the input signal and a feedback signal, outside the basic constellation of levels onto a level inside the basic constellation of levels as a function of the indexes.

25. The method according to claim 22, wherein the step of generating the feedback signal further includes multiplying a delayed version of the mapped constellation signal by a weighting element to generate the feedback signal.

26. The method according to claim 23, wherein the determining step further includes comparing the generated partial result with a table identifying the basic constellation of levels and a plurality of levels outside the basic constellation.

27. The method according to claim 23, further including generating a mapped constellation signal equal to the partial result if the partial result is inside the basic constellation of levels.

28. The method according to claim 19, further including the step of adding an offset to the index associated with a partial result generated by adding together the input signal and a feedback signal.

29. A computer-readable medium having stored thereon a plurality of instructions, the plurality of instructions including instructions that when executed by a processor cause the processor to implement a method of precoding an input signal to generate a mapped constellation signal for transmission, the method comprising:
generating said mapped constellation signal from said input signal; said generating step comprising:
mapping said input signal when contained in a first distinct range onto a basic level according to a first arithmetic rule to limit an amplitude of the mapped constellation signal, wherein the first arithmetic rule is selected based on the input signal being in the first distinct range, and
mapping said input signal when contained in a second distinct range onto the basic level according to a second arithmetic rule that differs from the first arithmetic rule, wherein the second arithmetic rule is selected based on the input signal being in the second distinct range, wherein the basic level is one level within a basic constellation of levels and wherein the mapping steps map each distinct range onto only one level inside the basic constellation of levels, such that a many-to-one mapping is created from each distinct range to a level inside the basic constellation of levels, and wherein the first distinct range forms part of a first constellation and mapping the input signal in the first distinct range onto the basic level includes partitioning the first constellation into a plurality of signal levels, some of the signal levels being separated by distance D1 and the second distinct range forms part of a second constellation having a plurality of signal levels some of which are separated by a distance D2 that differs from D1, and wherein the mapped constellation signal reduces noise associated therewith when received.

* * * * *